F. B. HOFFSTETTER AND F. J. RIPPL.
AUTOMATIC GLASS BLOWING MACHINE.
APPLICATION FILED JULY 13, 1915.

1,330,707.

Patented Feb. 10, 1920.
6 SHEETS—SHEET 2.

INVENTORS:
FRANK B. HOFFSTETTER,
FRANCIS J. RIPPL,
BY *Albert S. Davis*
THEIR ATTORNEY.

F. B. HOFFSTETTER AND F. J. RIPPL.
AUTOMATIC GLASS BLOWING MACHINE.
APPLICATION FILED JULY 13, 1915.

1,330,707.

Patented Feb. 10, 1920.
6 SHEETS—SHEET 4.

INVENTORS:
FRANK B. HOFFSTETTER,
FRANCIS J. RIPPL,
BY
THEIR ATTORNEY.

UNITED STATES PATENT OFFICE.

FRANK B. HOFFSTETTER, OF WARREN, AND FRANCIS J. RIPPL, OF CLEVELAND, OHIO, ASSIGNORS TO GENERAL ELECTRIC COMPANY, A CORPORATION OF NEW YORK.

AUTOMATIC GLASS-BLOWING MACHINE.

1,330,707.   Specification of Letters Patent.   Patented Feb. 10, 1920.

Application filed July 13, 1915. Serial No. 39,697.

*To all whom it may concern:*

Be it known that we, FRANK B. HOFFSTETTER and FRANCIS J. RIPPL, citizens of the United States, residing, respectively, at Warren, county of Trumbull, State of Ohio, and at Cleveland, county of Cuyahoga, State of Ohio, have invented certain new and useful Improvements in Automatic Glass-Blowing Machines, of which the following is a specification.

Our invention relates to automatic machines for blowing articles from glass tubing, and more particularly to machines of this character for manufacturing small incandescent lamp bulbs. Heretofore it has been the practice to make such bulbs entirely by hand or with the aid of certain mechanical contrivances requiring action by the operator to bring them into operation. The object of our invention is to produce a machine which will be substantially entirely automatic, the only hand operation necessary being the insertion, from time to time, of lengths of glass tubing.

According to our invention, we provide one or more holders for the glass tubing and a number of means which are caused to act upon the glass tubing to fuse a portion thereof and to blow the fused portion into the desired article, such means preferably including a mold. In its preferred form our invention comprises means for automatically advancing the tubing after the formation of an article so as to bring it into position for the formation of another article. Means are also preferably included for detaching each article after its formation and for preliminarily shaping the end of the glass tube for the formation of the next article. Although the object of our invention may be obtained in other ways, we prefer that the fusing means, the molding and other means be located at fixed points and that the glass tubing be carried from one means to another. This is preferably secured by providing means for rotating the holders upon an axis external thereof and by making such rotation intermittent, so that the glass tube may be successively brought into operative relation with each means in a predetermined sequence and allowed to remain in such relation for a predetermined interval until the desired step has been accomplished. As the continuous rotation of the glass tube during the various operations is desirable, we prefer to include means for securing this rotation. Various other features and advantages of our invention will appear from the detailed description which follows of a specific embodiment thereof and from the accompanying drawing. The scope of our invention is indicated in the claims appended hereto.

Our invention will be more clearly understood by referring to the accompanying drawing, in which is shown a machine especially adapted for the manufacture of small incandescent lamp bulbs and in which—

Fig. 9 is a detail plan of the chuck supports; Fig. 10 is a vertical section, Fig. 11 a bottom plan of the upper member, and Fig. 12 a top plan view of the lower member of the timing valve; Fig. 13 is a vertical section, Fig. 14 a top plan view of the upper member, and Fig. 15 a top plan view of the lower member of the distributing valve in the air supply system; Fig. 20 is a section on the line III—III of Fig. 19.

Figure 1:
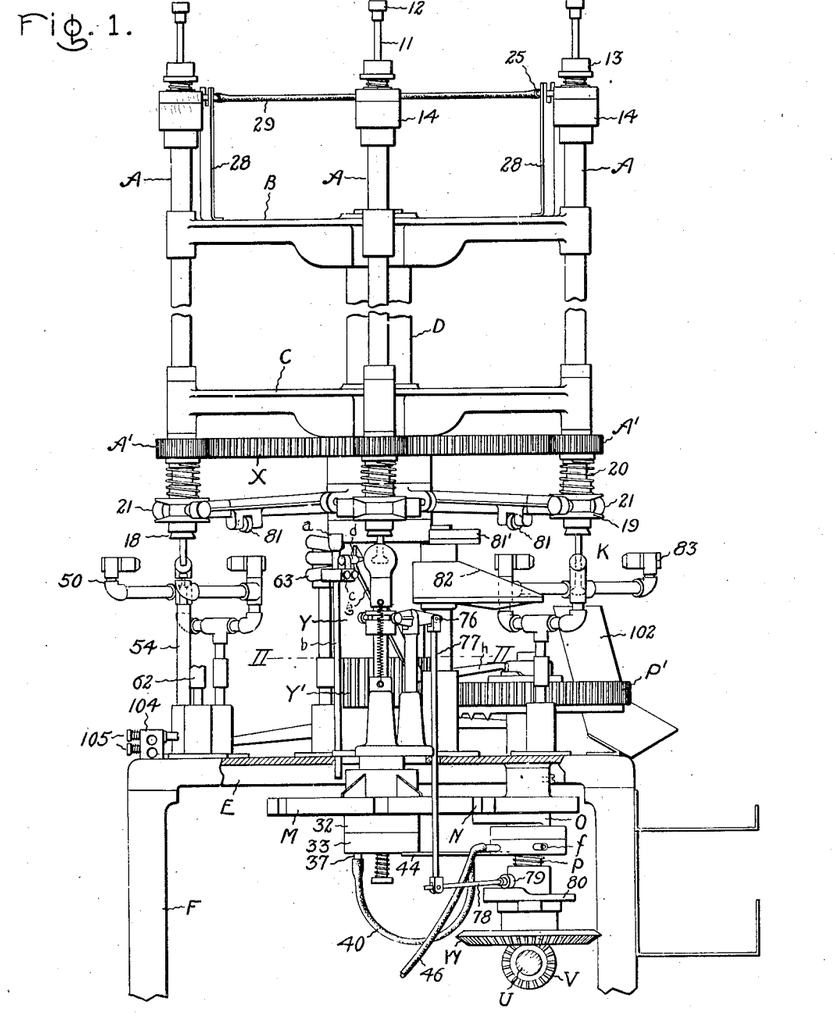
Figure 1 is an elevation of a bulb blowing machine embodying our invention.
Figure 2:
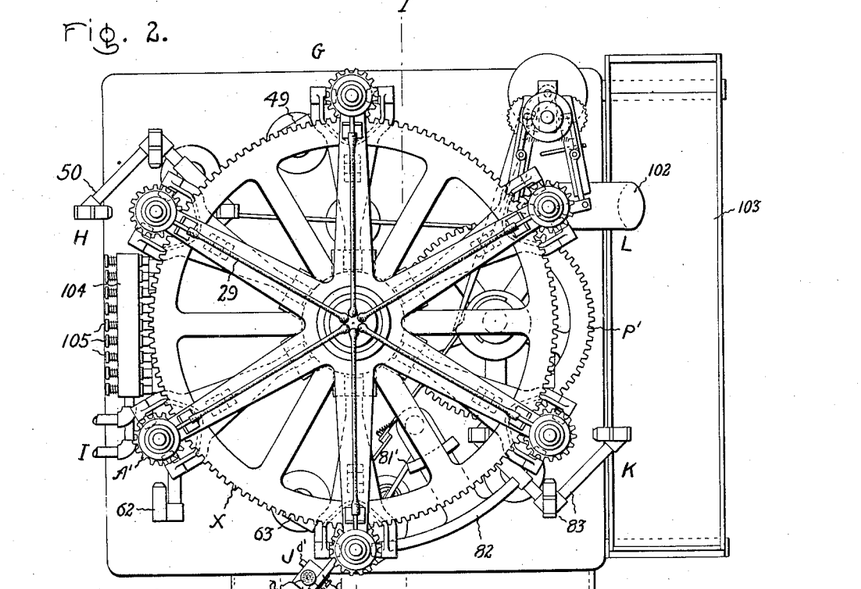
Fig. 2 is a top plan view thereof.
Figure 5:
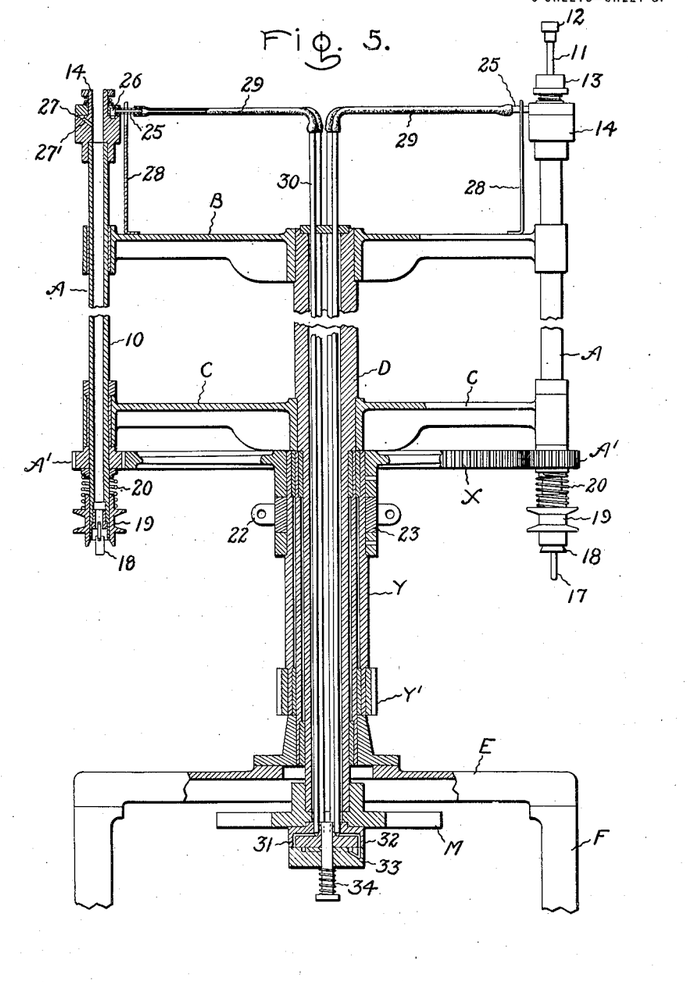
Fig. 5 is a vertical section, partly in elevation, on the line I—I of Fig. 2.
Figure 6:
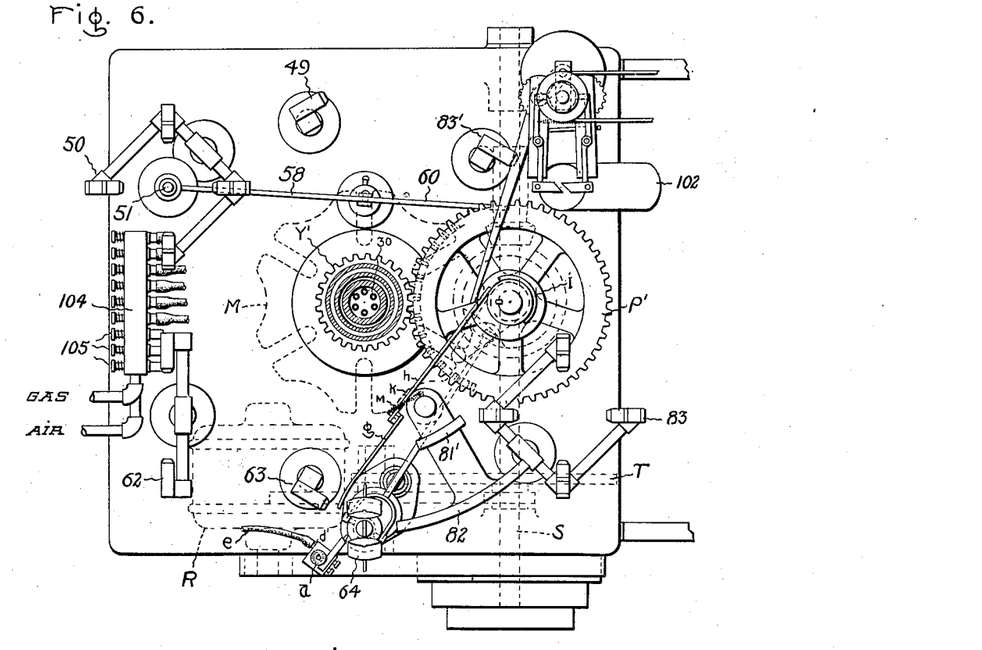
Fig. 6 is a horizontal section on the line II—II of Fig. 1.

Referring now to Figs. 1, 2 and 6, it will be seen that the machine comprises a number of tubular holders A, each of which receives a length of glass tubing. As shown, these are six in number and are each rotatably supported in a frame comprising upper and lower spiders B and C respectively. The said spiders are carried by the central hollow shaft D, which, as shown more particularly in Fig. 5, extends through the bedplate E of the machine, which is supported by standards F. The central shaft is rotated intermittently so as to cause each of the tube holders to stop for a definite period with the depending glass tube in operative relation to one of a series of means each of which has a definite function in producing the bulb. These means, as shown, correspond in number to the number of holders and are indicated as G to L inclusive in Fig. 2. The means G is for fusing the bottom of the glass tube, the means H for suitably shaping the bottom of the glass tube, and the means I for further fusing the portion of the glass tube which is to form the bulb. Means J includes the mold and means for bringing the same into operative relation with the end of the glass tube. Means K is for fusing the glass tube above the bulb as a preliminary for detaching the bulb, and means L is for detaching the completed bulb and causing its discharge into a suitable receptacle.

The intermittent drive for the center shaft comprises a disk M, slots in which are engaged by a pin N extending from an arm O mounted on a shaft P, which is driven by a power source, such as the motor R, which drives a shaft S connected by a speed reducing gear train T with a shaft U carrying the bevel gear V engaging the bevel gear W mounted upon the said shaft P.

The holders A are constantly rotated, and, to this end, each carries a pinion A'. These pinions all intermesh with a large toothed wheel X, which is mounted on a sleeve Y on the central shaft D. The said sleeve carries circumferentially thereof a pinion Y' which is engaged by a gear P' on the shaft P.

Figures 9, 10, 11, 13, 14:
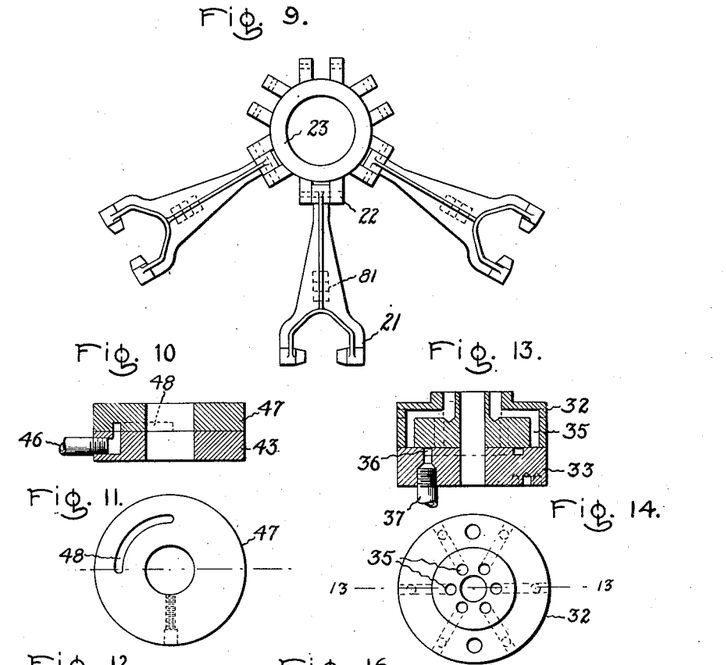

Referring to Fig. 5, it will be seen that each holder A comprises a tubular casing 10. Each casing 10 is adapted to receive one of the glass tube holders shown in Fig. 16. Each of the holders comprises a tube 11 having a cap 12 thereon and carrying a stopper 13, which is adapted to enter a boss 14 carried by the casing 10. The bottom of the tube 11 is formed at 15 to receive a rubber or other flexible connection 16, into which is inserted the end of a glass tube 17 from which bulbs are to be made. At the bottom of the casing 10 is located a chuck of a well known type, which comprises a number of downwardly depending pivoted jaws 18, which in the position shown in Fig. 5, are closed so as to firmly hold a glass tube. These jaws are engaged by a sleeve 19, between which and the pinion A' is interposed a suitable spring 20. The said sleeves are flanged and, as shown in Figs. 2 and 9, are supported in the bifurcated ends of arms 21, which are pivoted at 22 on sleeve 23 loosely supported on the central sleeve Y, hereinbefore referred to.

Figure 12:
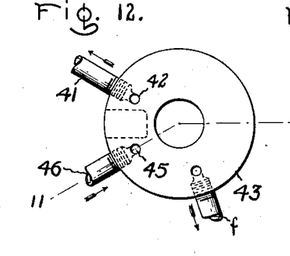
Figure 15:
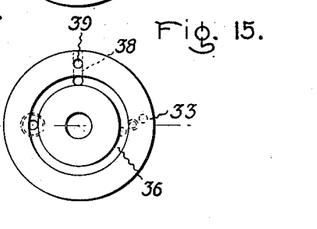
Figure 16:
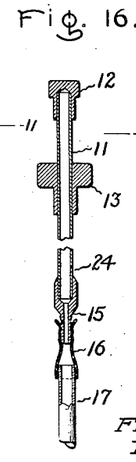
Fig. 16 is a detail in vertical section of one of the glass tube holders.
Figure 17:
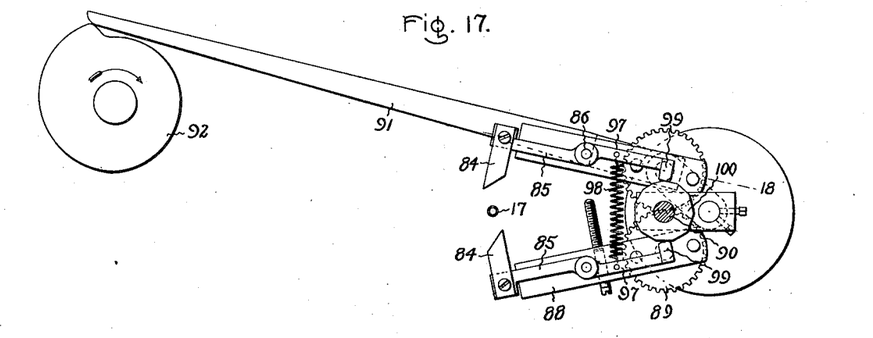
Fig. 17 is a plan view, Fig. 18 a partial vertical section, and Fig. 19 a side elevation of the mechanism for detaching the completed bulb.

After the mold, hereinafter described, closes about the fused end of a glass tube it is necessary to force a puff of air through the glass tube in order to blow the bulb. As shown in Fig. 16, tube 11 of the glass tube holder is apertured at 24. Air is admitted to the casing 10 and so through the aperture 24 to the glass tube. As shown in Fig. 5, the boss 14 comprises two parts detachably held together. The upper part carries a nipple 25 communicating with a port 26 which communicates with an annular channel 27 in the top of the lower part. The channel 27 communicates with the interior of casing 10 through port 27'. The nipple 25 is held within the forked end of standard 28 supported on the top of the spider B so as to prevent rotation of the boss 14. An air supply tube 29 connects the nipple 25 with a supply pipe 30 extending through the central shaft D and connecting with a port 31 in the upper movable member 32 of the distributing valve which also comprises a lower stationary member 33. The movable member 32 is carried by the disk M, while stationary member 33 is held to said movable member by a spring pressed locking means 34. The distributing valve is shown more particularly in Figs. 13 to 15. The upper movable member 32 has therein six ports 35. The stationary member has in the upper surface thereof a circular channel 36 with which communicates a supply pipe 37. The said channel communicates by a passage 38 with a port 39. Each of the ports 35 registers in turn with the port 39 when the glass tube corresponding to a certain port 35 is in the blowing position, that is, has reached the mechanism J. The supply pipe 37 connects, as shown in Fig. 1 and in Figs. 10 to 12 inclusive, by means of tube 40 with a tube 41 communicating with a port 42 in the lower stationary member 43 of the timing valve. In order to hold the members 33 and 43 of the respective valves stationary, they are connected by a strap 44, as shown in Fig. 1. The stationary member 43 also has a vertical port 45 which is connected to a supply pipe 46 leading from a source of compressed air. The upper movable member 47 of the timing valve has in the lower surface thereof a channel 48. The member 47 is rotated on the shaft P and at predetermined intervals the channel 48 connects the ports 42 and 45, thus causing a puff of air to be transmitted through tube 40 and through the distributing valve to a supply pipe 30 and to the corresponding glass tube.

Figures 7, 8:
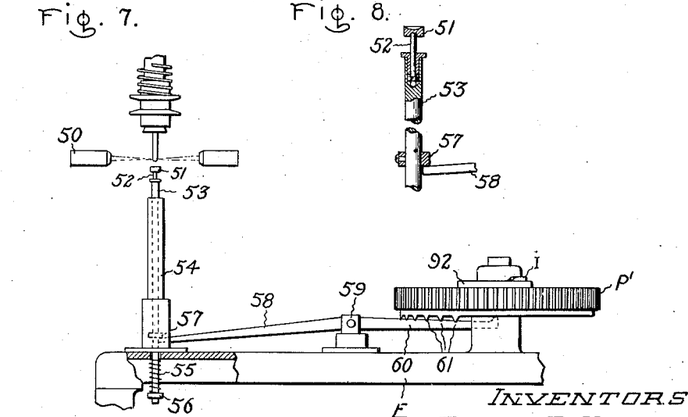
Figs. 7 and 8 are details showing the mechanism for preliminarily shaping the end of the glass tube.

Referring now to Fig. 2, a glass tube having been inserted in each of the holders, we will consider the particular holder which happens to be in operative relation with the means G. This means comprises a gas and air burner 49, which directs a flame against the bottom of the glass tube projecting from the holder to fuse the same. When this operation is completed, the intermittent gear will cause a rotation of the various holders so that the holder under consideration will be brought into operative relation with the means H. This is a means for shaping the lower ends of the glass tubes so as to thicken and shape them. It comprises a set of four gas and air burners 50, each of which directs a flame against the bottom portion of the glass tube, and also a mechanism which is shown in detail in Figs. 7 and 8, which comprises a small block 51 having a concave upper surface which comes in contact with the bottom of the glass tube. This block is carried by a pin 52 removably and rotatably supported in a reciprocatable rod 53 supported in sleeve 54 mounted on the bed-plate of the machine, the rod 53 extending through said sleeve and below the said bed-plate. A spring 55 surrounding the lower end of the said rod is held between a nut 56 and the bottom of the said bed plate. A ring 57 mounted on said rod is engaged by an arm 58 having a fulcrum 59 mounted on the bed-plate, and having an extension 60 therebeyond, the end of which is successively engaged by a series of projections 61 on the bottom of the gear wheel P'. The cams 61 are progressively higher so that the throw of the vibrating lever 58 increases progressively as the gear P' rotates, thus causing a corresponding increase in the throw of the block 51 and a gradual shaping of the fused glass at the bottom of the tube.

Figure 3:
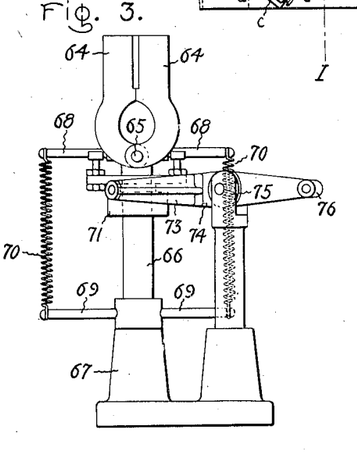
Fig. 3 is an elevation and Fig. 4 is a plan of the mold and a part of the operating mechanism therefor.
Figure 4:
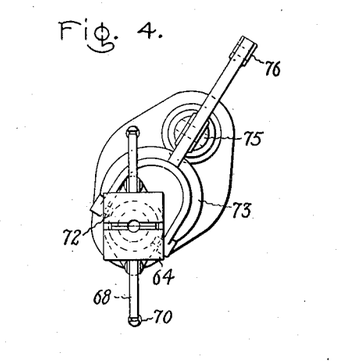

The glass tube is next brought into operative relation with the means I, which comprises an opposed pair of superposed series of gas and air burners 62. These direct a flame against a portion of the glass tube practically co-extensive with the portion which is to be formed into a bulb. The glass tube is then brought into operative relation with a means J. This comprises three superposed gas and air burners 63, which are positioned to direct a flame against the glass tube and against the mold, also comprised by means J, when in closed position. The mold is shown in detail in Figs. 3 and 4. It comprises two sections 64, which are pivoted together at 65 on a vertical stud 66 supported in a standard 67 on the bed of the machine. Each of the mold sections has extending therefrom a pin 68 between which and corresponding pins 69 extending from the standard 67 extend springs 70. The mold sections are closed against the tension of these springs. Each of the mold sections is adjustably connected to a sleeve 71 which is slidable on the stud 66. The said sleeve is channeled to receive pins 72 carried by the forked end 73 of the lever 74 fulcrumed in a stud 75 supported on the bed-plate of the machine. The other end of the lever is pivotally connected at 76 to a vertically extending rod 77, as shown in Fig. 1, to which is pivoted an arm 78 carrying roller 79, which engages a cam 80 mounted on the shaft P. The mechanisms of the machine are so coördinated that at the proper time the mold sections are closed around the fused end of one of the glass tubes. The blowing mechanism is so regulated that a puff of air is then admitted to the glass tube blowing it in the mold, and at the same time, it will be remembered, that the glass tube is constantly rotated. The cam 80 then allows the roller 79 to be raised and this causes the mold to be opened.

In order to improve the molding operation, a means may be provided for spraying a liquid such as oil upon the inner surface of the mold just before the same is closed. As shown in Figs. 1, 2 and 6, this means comprises an oil cup $a$ supported on a standard $b$ and feeding into an atomizing chamber $c$ from which it is discharged through a nozzle $d$ against the inside of the open mold. The air supply enters through a port $d'$ connected preferably by a flexible tube $e$ with a port $f$ in the lower member 43 of the distributing valve. The channel 48 in the upper movable valve member 47 connects the supply port 45 with port $f$ just prior to the closing of the mold.

A means may also be provided for interrupting the play of the flame from burners 63 against the mold after the end of the glass tube has been sufficiently heated so as to prevent unnecessary heating of the mold. As shown in Figs. 1, 2 and others, this comprises a baffle $g$ carried by a lever $h$ fulcrumed at $k$ on a suitable standard and having its other end positioned so as to be periodically engaged by a cam $l$ preferably integral with cam 92. The cam $l$ causes the baffle $g$ to be lowered just prior to the operation of the mold spraying means and allows it to be raised by a suitable spring $m$ when another glass tube is in position for heating.

Figures 18, 19, 20:
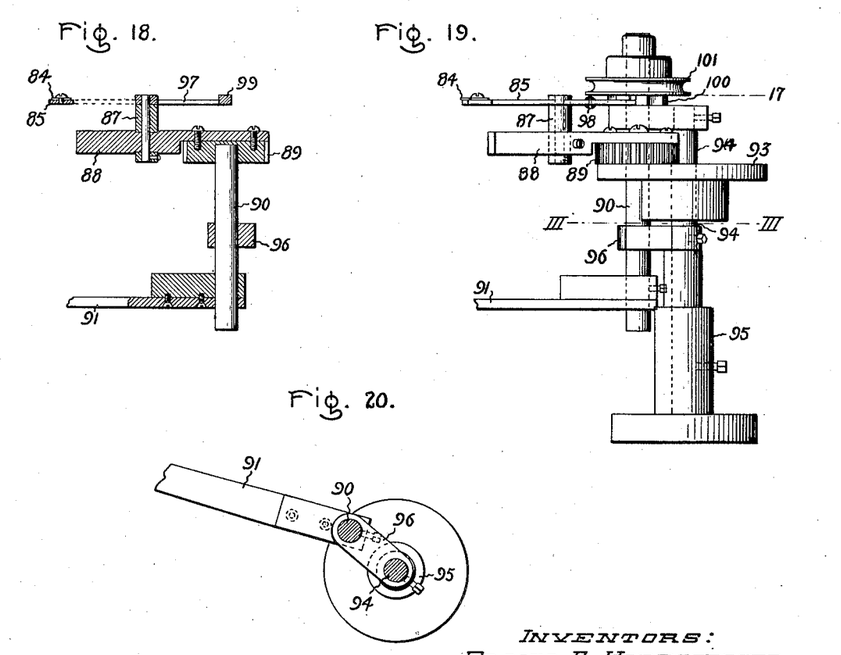

The intermittent rotary mechanism next carries the glass tube into operative relation with a means K. During this movement an arm 21 is elevated by the engagement of a roller 81 thereon with a short segmental track 81', thus causing the corresponding chuck 18 to be opened and the glass tube held thereby to descend and the end thereof to rest on the downwardly inclined surface of gage 82. The glass tube is thus allowed to descend until the cam 81' is passed, when the chuck again closes gripping the glass tube, and in this position the parts move into operative relation with the means K. This comprises four gas and air burners 83 which direct a flame against the glass tube at the cut-off point. After the proper interval, the glass tube is rotated to the cut-off means L, which is shown in detail in Figs. 17 to 20 inclusive. In connection with this means a burner 83' may be provided which directs its flame against the cut-off portion of the tube. This means comprises a pair of knife blades 84 between the opposed cutting edges of which the glass tube is brought to rest with the portion which has been previously fused in line with the said cutting edges. The said knife blades are each removably held in a holder arm 85, and each arm is pivoted at 86 on a stud 87 mounted in an arm 88 supported on a pinion 89. The teeth of the respective pinions 89 intermesh. As shown in Fig. 18, one of the pinions 89 is mounted on a shaft 90, which carries at the bottom thereof the arm 91. The end of arm 91 engages a cam 92 which is mounted on the vertical shaft P. The rotation of this cam causes the arm 91 to be oscillated and this in turn oscillates the shaft 90 turning one of the pinions 89, and because of the intermeshing of this with the other pinion 89 causes the knife blades 84 to come together to cut the glass tube and then to separate. The pinions 89 are supported by a plate 93, which is carried by a stud 94 adjustably mounted in a standard 95 carried by the bed-plate of the machine. A bearing 96 is sleeved on the stud 94 and the shaft 90 so as to hold the said parts in properly spaced relation. The fulcrumed holder arms 85 have extensions 97 which are connected by spring 98 and have ends 99 bearing against the polygonal cam 100. This is constantly rotated through the pulley 101 by any desired means, such as a motor, which will cause its rapid rotation and so the rapid vibration of the knife blades. The purpose of this is to prevent the sticking of the knife blades when they come in contact with the fused glass and so to produce a clean cut. The detached bulb falls through a chute 102 into a suitable receptacle 103.

The gas and air mixture for the various burners comprised in the above described apparatus is preferably distributed through a manifold 104 provided with suitable regulating valves 105.

What we claim as new and desire to secure by Letters Patent of the United States, is:—

1. An automatic machine for blowing articles from glass tubing comprising a holder for a glass tube, means for feeding said tubing intermittently through said holder, means for fusing an end of said tube, a mold and means for bringing the same and said tube end into operative relation with each other, means for forcing air into the end opposite the fused end of the said glass tube, and means for causing the automatic operation of the aforesaid means in a predetermined sequence and for predetermined intervals.

2. An automatic machine for making articles from glass tubing comprising a holder for a glass tube, means for rotating said holder about an axis external thereof, means for also rotating said holder about its own axis, a two-part mold disposed in the path of rotation of said holder, means for closing the said mold about a projecting end of the said glass tube, means for forcing air into the said glass tube while engaged by the said mold to blow the desired article, means of detaching the completed article from the said glass tube, and means for causing the aforenamed means to operate in a predetermined sequence and for predetermined intervals.

3. An automatic machine for blowing articles from glass tubing comprising a frame with a plurality of holders thereon for the glass tubing, means for advancing the frame step by step, means for rotating the holders and the tubes about their own axes, fusing means located at a position of rest for fusing the ends of the tubes as the holders advance, a mold located at the succeeding position of rest for shaping the fused tube ends, means for causing the mold to close around the tube ends, a source of gaseous fluid pressure supply, a timing valve actuated in synchronism with said advancing means for admitting pressure to said tubes during the molding operations, and a distributing valve also actuated in synchronism with the advancing means for connecting the proper tube with the timing device at each period of rest.

4. An automatic machine for blowing articles from glass tubing comprising a plurality of vertically disposed holders for the glass tubes, means for advancing the said holders in a step by step manner about an external axis, means for rotating said holders and tubes about their own axes, a mold disposed in the path of advance of the ends of said tubes, means for causing said mold to assume an operative relation with respect to the ends of said tubes as they advance step by step, a means for forcing air into said tubes while engaged by the said mold for forming the desired article comprising a timing valve actuated in synchronism with said advancing means for admitting pressure to said tubes during the molding operations, and a distributing valve also actuated in synchronism with said advancing means for connecting the proper tube with the timing device.

5. An automatic machine for forming articles from the glass tubing comprising a holder for a glass tube, means for rotating said holder about an external axis, a mold disposed in the path of rotation of an end of said tube, means for causing said holder to stop adjacent to said mold, means for causing said mold to assume an operative relation with respect to the end of said tube, means for forcing air into said tube while engaged by the said mold for forming the desired article, means for detaching the completed article from said tube, and means brought into operation thereafter for fusing and shaping the end of the tube preparatory to molding the next article.

6. An automatic machine for forming articles from glass tubing comprising a holder for a glass tube, means for rotating said holder about an external axis, fusing means and a mold for forming the desired article disposed in the path of rotation of an end of said tube, means for causing said mold to assume an operative relation with respect to the end of said glass tube, means for forcing air into said tube while engaged by the said mold, means for detaching the completed article from the tube, and means brought into operation thereafter for fusing and shaping the exposed end of the tube preparatory to blowing the next article comprising devices for delivering a series of impacts to the end of the tube.

7. An automatic machine for forming articles from glass tubing comprising a holder for a glass tube, means for rotating the said holder about an external axis, fusing means and a mold for forming the desired article disposed in the path of rotation of an end of said tube, means for causing said mold to assume an operative relation with respect to the end of said glass tube, means for forcing air into said tube while engaged by the said mold, means for detaching the completed article from the tube, and means brought into operation thereafter for fusing and shaping the exposed end of the tube preparatory to blowing the next article comprising an impacting device and a series of cams for actuating said impacting device.

8. An automatic machine for forming articles from glass tubing comprising a holder for a glass tube, means for rotating the said holder about an external axis, fusing means and a mold for forming the desired article disposed in the path of rotation of an end of said tube, means for causing said mold to assume an operative relation with respect to the end of said glass tube, means for forcing air into said tube while engaged by the said mold, means for detaching the completed article from the tube, and means brought into operation thereafter for fusing and shaping the exposed end of the tube preparatory to blowing the next article comprising an impacting device actuated by a series of cams gradually increasing in height.

9. An automatic machine for blowing incandescent lamp bulbs from glass tubing comprising a frame carrying a plurality of vertically disposed holders for the tubing, means for intermittently rotating said frame about its axis, means for rotating said holders about their own axes, fusing means disposed in the path of rotation of said holders and in position to act upon a projecting end of said glass tube, a two-part mold also located in the path of rotation of said tube end, means for closing the said mold about the said tube ends, means driven by the frame for admitting air pressure into the said tube while engaged by said mold for blowing the desired article, means for detaching the completed article, and fusing and shaping means brought into operation thereafter for preparing the end of the tube for blowing the next article.

10. In an automatic machine for making incandescent lamp bulbs from glass tubing, an intermittently rotated frame, a plurality of vertically disposed chucks carried by said frame for carrying the tubes, gearing for continuously rotating said chucks about their own axes, a set of burners for successively fusing the tube ends as they are advanced step by step by the frame, a mold for molding the bulbs from the fused ends as they advance step by step, timing valves driven by the frame for admitting air pressure to the tube during the molding operation, severing devices for detaching the completed bulbs from the tube ends, and fusing and shaping devices for operating upon the exposed tube ends preparatory to forming the bulbs.

11. In an automatic machine for making incandescent lamp bulbs from glass tubing, an intermittently operated frame, a plurality of rotating chucks carried by said frame for carrying the tubes, said chucks carrying tube holders, fusing burners, located in the path of the tube ends and adapted to fuse the tubes as they advance step by step, molding devices located in the path of the advancing tube ends and operating devices for bringing the tube ends and the molds into operative relation, timing and distributing valves driven by the intermittently operated frame for establishing communication between the tube holders and a source of air pressure during the molding operation, means for successively releasing the chucks as they advance step by step to permit the tubes to descend a predetermined distance, detaching devices located in the path of the tubes and adapted to successively sever the completed bulbs as the tubes advance, and fusing and shaping devices thereafter brought into operation to thicken the end of the tube preparatory to the beginning of the next cycle.

In witness whereof FRANK B. HOFFSTETTER has set his hand this 3rd day of July, 1915, and FRANCIS J. RIPPL has set his hand this 7th day of July, 1915.

FRANK B. HOFFSTETTER.
FRANCIS J. RIPPL.